United States Patent [19]
Haake et al.

[11] Patent Number: 5,870,518
[45] Date of Patent: Feb. 9, 1999

[54] MICROACTUATOR FOR PRECISELY ALIGNING AN OPTICAL FIBER AND AN ASSOCIATED FABRICATION METHOD

[75] Inventors: John M. Haake, St. Charles, Mo.; Vijayakumar R. Dhuler, Raleigh; Robert L. Wood, Cary, both of N.C.

[73] Assignee: McDonnell Douglas Corporation, St. Louis, Mo.

[21] Appl. No.: 916,089

[22] Filed: Aug. 21, 1997

[51] Int. Cl.[6] .................................................. G02B 6/36
[52] U.S. Cl. ................................................ 385/90; 385/88
[58] Field of Search ........................... 385/88–90, 14–16, 385/19, 134, 136, 138

[56] References Cited

U.S. PATENT DOCUMENTS

| | | | |
|---|---|---|---|
| 3,836,225 | 9/1974 | Wilde et al. | 385/115 |
| 4,688,885 | 8/1987 | Poteat et al. | 385/99 |
| 5,080,458 | 1/1992 | Hockaday | 385/14 |
| 5,181,214 | 1/1993 | Berger et al. | 372/34 |
| 5,214,727 | 5/1993 | Carr et al. | 385/22 |
| 5,457,765 | 10/1995 | Suzuki et al. | 385/137 |
| 5,483,608 | 1/1996 | Yokomachi et al. | 385/22 |
| 5,553,182 | 9/1996 | Haake | 385/89 |
| 5,602,955 | 2/1997 | Haake | 385/136 |
| 5,606,635 | 2/1997 | Haake | 385/53 |
| 5,699,463 | 12/1997 | Yang et al. | 385/22 |

*Primary Examiner*—Hemang Sanghavi
*Attorney, Agent, or Firm*—Senniger, Powers, Leavitt & Roedel

[57] ABSTRACT

A microactuator for precisely aligning an optical fiber with an optical device and an associated method of fabrication thereof. The microactuator includes a carrier positioned on a base for holding the optical fiber. An alignment frame positioned on the carrier remotely from the optical fiber is adapted to engage the base and the carrier. The carrier is movable relative to the base and the alignment frame. At least one actuator has a beam for engaging the alignment frame and a pad affixed to the carrier. The beam and pad move relative to each other when the actuator is actuated. The actuator is positioned on the carrier so that the beam engages and applies a force to the alignment frame in a predetermined direction when the actuator is actuated. This causes the pad to apply an opposite force to the carrier causing the carrier to move in a direction opposite the predetermined direction for controllably positioning the carrier relative to the base and precisely aligning the optical fiber with the optical device.

35 Claims, 5 Drawing Sheets

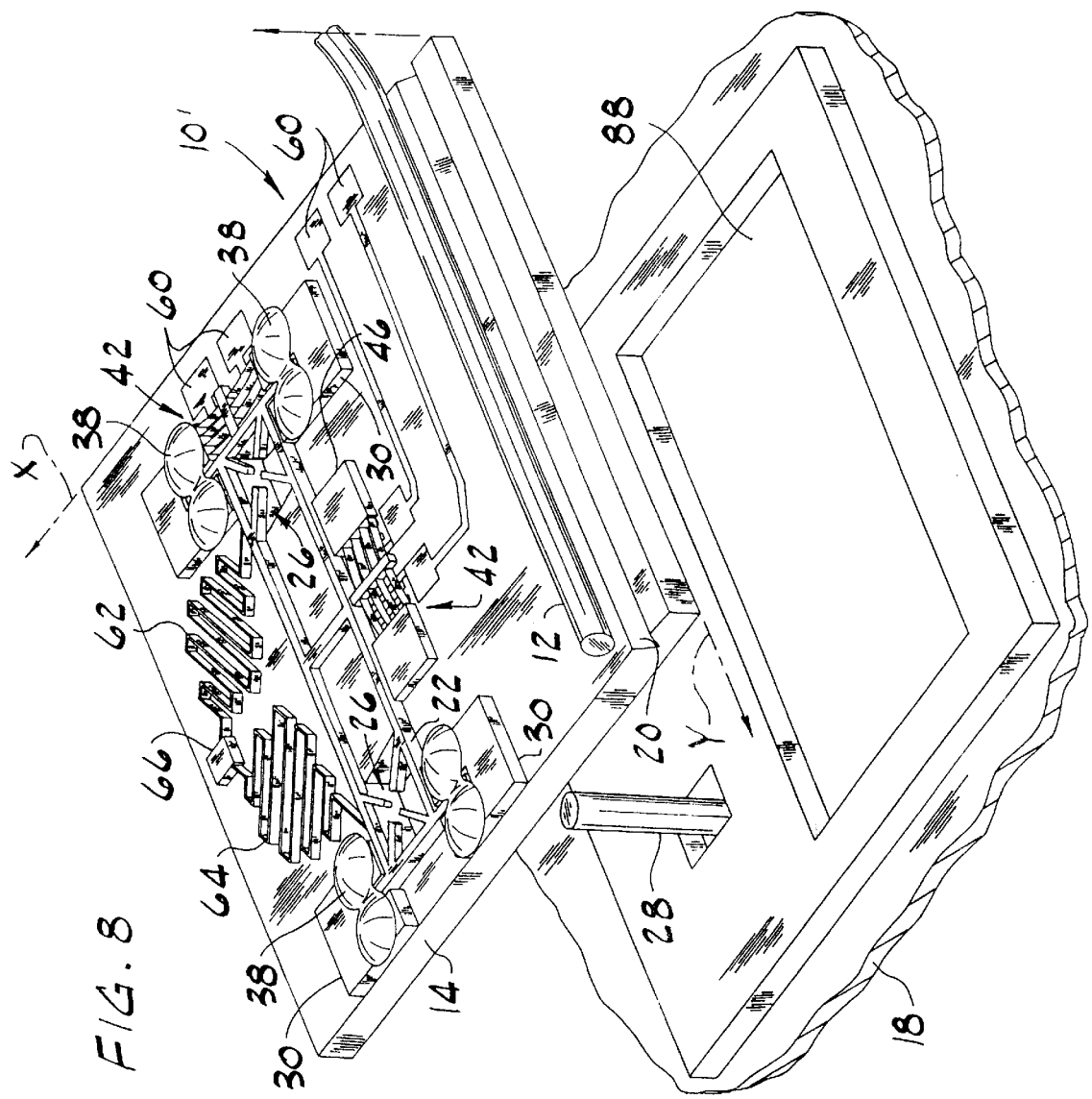

MICROACTUATOR FOR PRECISELY ALIGNING AN OPTICAL FIBER AND AN ASSOCIATED FABRICATION METHOD

STATEMENT OF GOVERNMENT INTEREST

The invention described herein may be manufactured and used by or for the Government for governmental purposes without the payment of any royalty thereon.

TECHNICAL FIELD

The present invention relates generally to systems and methods for controllably positioning an optical fiber and, more particularly, to a microactuator for precisely aligning an optical fiber with an optical device and an associated method of fabricating such a microactuator.

BACKGROUND ART

In general, microactuators permit an optical fiber to be aligned with an electro-optic device, such as a laser diode or even another optical fiber. Such alignment is particularly desirable for maximizing the percentage of light coupled from the light source (i.e., the electro-optic device) to the optical fiber. In turn, this increases the transmission efficiency of the optical signals. However, the relatively small sizes of both the optical fiber waveguide and the light source complicates the alignment of optical fibers. For example, a typical single mode optical fiber has a light transmitting core diameter of approximately 2 to 10 $\mu$m and a suitable light source is usually about the same size.

Commonly assigned U.S. Pat. No. 5,602,955, the entire disclosure of which is incorporated herein by reference, describes various methods and apparatus known in the art for aligning an optical fiber as well as the shortcomings associated with those methods and apparatus. For example, one known method includes aligning the fiber and bonding it in place with solder or some other bonding agent. Such bonding typically requires heating the bonding agent while the fiber is being aligned and then allowing the bonding agent to cool. Unfortunately, heating in this manner often causes misalignment of adjacent optical fibers. U.S. Pat. No. 5,602,955 shows a microactuator which controllably positions an optical fiber without the need for heating during alignment thereby preventing misalignment of adjacent optical fibers.

This patent further overcomes conventional alignment and bonding systems and methods which are generally relatively laborious and time-intensive, particularly in instances in which a number of optical fibers must be individually aligned, and require a variety of relatively complex and costly components which significantly increase the fabrication costs to produce such precisely aligned optical devices.

In addition, the microactuator of U.S. Pat. No. 5,602,955 precisely aligns an optical fiber within a hermetically sealed package, such as a standard 14-pin hermetic butterfly package, in which opto-electronic devices are typically disposed.

Although the microactuator of U.S. Pat. No. 5,602,955 provides a significant improvement over the existing art, further improvements are desired for providing a microactuator which is internally referenced so that it returns to an equilibrium, unenergized position without the need for an external alignment support structure, or well, or external counteract springs. In addition, U.S. Pat. No. 5,602,955 discloses a microactuator fabricated with bimorphic actuators. Therefore, it is also desired to fabricate a microactuator which provides for movement in at least two directions without bimorphic actuators to simplify construction.

DISCLOSURE OF THE INVENTION

The invention meets the above needs and overcomes the deficiencies of the prior art by providing an improved apparatus and method for precisely aligning an optical fiber. This is accomplished by an internally referenced microactuator. By providing such a microactuator which does not employ an external alignment support structure, the present invention permits smaller microactuators to be fabricated which leads to cost savings, greater packing densities during fabrication and the like. The microactuator of the present invention controllably positions an optical fiber in two or three orthogonal directions to precisely align it with an associated optical device. This is accomplished by three actuators, such as two thermally actuated arch beam actuators and a bimorphic actuator. By providing an internally referenced structure, single material actuators, such as thermally actuated arch beam actuators may be employed. Again, this provides cost savings during fabrication. During the process of aligning the optical fiber, the microactuator does not heat or otherwise perturb adjacent microactuators or optical fibers. This enables the precise alignment of a plurality of adjacent optical fibers. Further, by providing thermal isolation, heat is not dissipated throughout the structure and the response of the thermal actuators is improved.

Briefly described, a microactuator embodying aspects of the present invention is for precisely aligning an optical fiber with an optical device which has a fixed relation to a base. The microactuator includes a carrier positioned on the base for holding the optical fiber in a fixed relation to the carrier. An alignment frame is positioned on the carrier remotely from the optical fiber and the carrier is movable relative to the alignment frame and the base. The microactuator also includes an actuator having a beam for engaging a portion of the alignment frame and a pad affixed to the carrier. The beam and pad move relative to each other when the actuator is actuated. The actuator is positioned on the carrier so that the beam engages and applies a force to the alignment frame in one direction when the actuator is actuated. As a result, the pad applies an opposite force to the carrier causing it to move in the opposite direction for controllably positioning the carrier relative to the base and precisely aligning the optical fiber with the optical device.

In another embodiment, a method of the invention provides for precisely aligning an optical fiber with an optical device which is in a fixed relation to a base. First, the method includes the step of holding the optical fiber in a fixed relation to a carrier. The method also includes positioning an alignment frame on the carrier remotely from the optical fiber and positioning an actuator on the carrier and connecting the actuator thereto. The alignment frame is adapted to engage the base and the carrier and the carrier is movable relative to the alignment frame and the base. The actuator has a beam for engaging the alignment frame and a pad affixed to the carrier. The step of positioning the actuator includes disposing the actuator so that the beam engages and applies a force to the alignment frame in one direction when the actuator is actuated. The method further includes the step of actuating the actuator. As a result, the pad applies an opposite force to the carrier causing the carrier to move in the opposite direction for controllably positioning the carrier relative to the base and precisely aligning the optical fiber with the optical device.

Yet another embodiment of the invention is directed to a method of fabricating a microactuator for precisely aligning an optical fiber with an optical device which has a fixed relation to a base. The method includes the steps of forming a carrier and etching a groove in the carrier. The groove receives the optical fiber and maintains it in a fixed relation to the carrier. The method also includes forming an alignment frame and an actuator on the carrier remotely from the groove. This alignment frame is adapted to engage the base and the carrier and the carrier is movable relative to the alignment frame and the base. The actuator has a beam for engaging the alignment frame and a pad affixed to the carrier. The beam and pad move relative to each other when the actuator is actuated. The method also includes the step of positioning the carrier on the base. The step of forming the actuator includes disposing the actuator so that the beam engages and applies a force to the alignment frame in one direction when the actuator is actuated. As a result, the pad applies an opposite force to the carrier causing the carrier to move in the opposite direction for controllably positioning the carrier relative to the base and precisely aligning the optical fiber with the optical device.

Other objects and features will be in part apparent and in part pointed out hereinafter.

BRIEF DESCRIPTION OF DRAWINGS

FIG. 8 is a perspective view of a microactuator according to another preferred embodiment of the invention.

Corresponding reference characters indicate corresponding parts throughout the drawings.

BEST MODES FOR CARRYING OUT THE INVENTION

Figure 1:
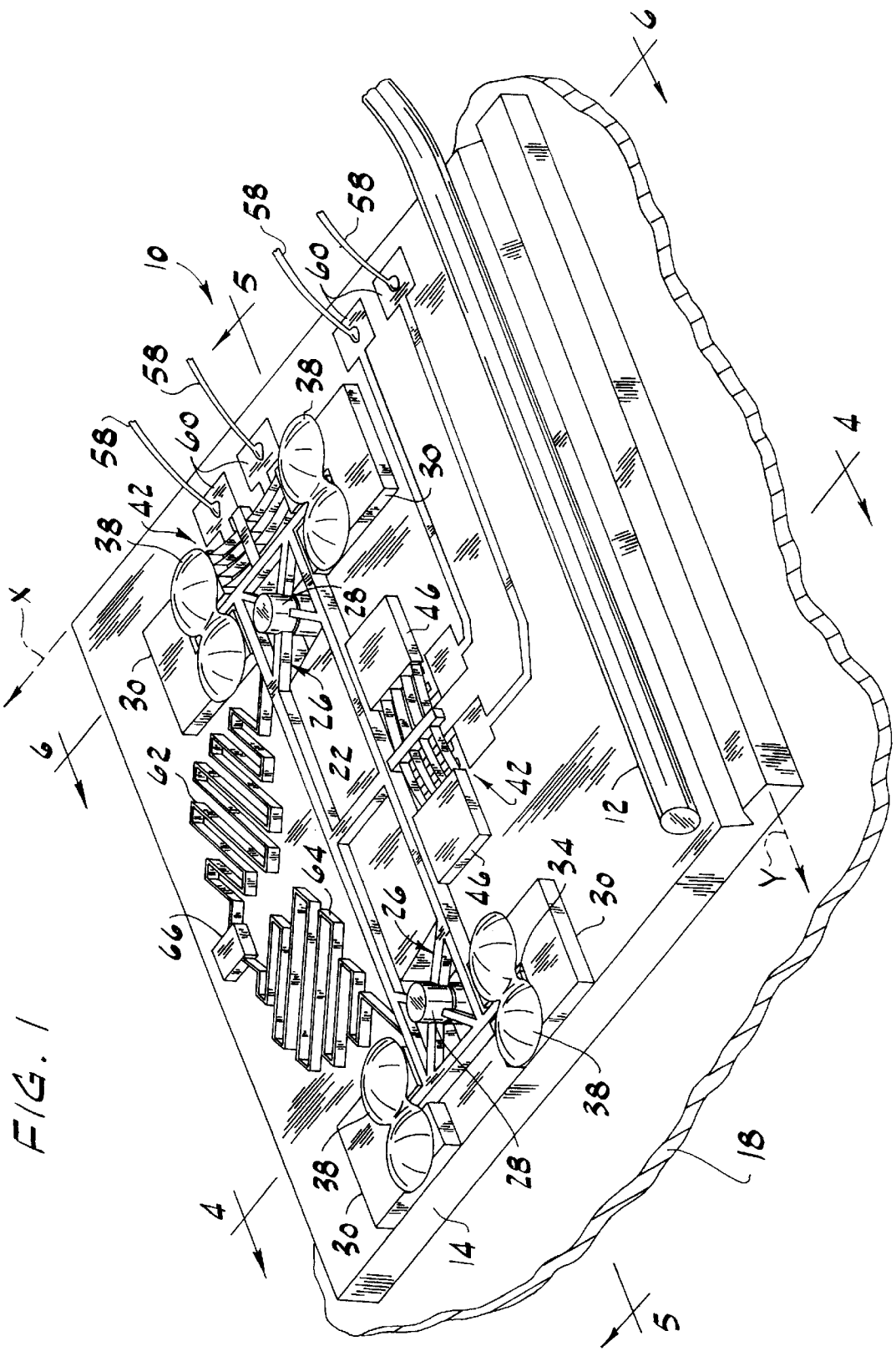
FIG. 1 is a perspective view of a microactuator according to a preferred embodiment of the invention.

Referring now to FIG. 1, a microactuator, generally indicated 10 and embodying aspects of the invention, is shown. In the illustrated embodiment, the microactuator 10 controllably positions an optical fiber 12 to precisely align it with an associated optical device (not shown), such as a laser diode or another optical fiber. For example, the optical fiber 12 may be a single mode, multi-mode or polarization preserving optical fiber, although microactuator 10 is particularly well suited for precisely aligning single mode optical fibers. In addition, optical fiber 12 may have a lensed facet or a cleaved end facet without deviating from the scope of the invention.

As shown in FIG. 1, microactuator 10 has a substrate 14 upon which its various components are fabricated. Preferably, the substrate 14 rests upon a base 18 and has a groove 20 defined in its body for receiving and holding the optical fiber 12 in a fixed relation thereto. In one preferred embodiment, substrate 14 comprises a layer of polished silicon. Therefore, an anisotropic wet etching process as known in the art may be used to form the groove 20. Other materials, such as metallic materials, are contemplated for substrate 14. As will be described in detail below, however, substrate 14 preferably has a polished surface in contact with the base 18. In this instance, groove 20 has a V-shaped cross section with opposing side walls defining an angle of approximately 55° with respect to the top surface of substrate 14. It is to be understood, however, that groove 20 may be formed by a variety of processes and may have a variety of other cross-sectional shapes without deviating from the scope of the invention.

An optical fiber bonding agent or solder, for example, secures optical fiber 12 within groove 20 to maintain it in a fixed position relative to substrate 14. For example, an optical fiber bonding agent, such as Gould GlasSolder™ bonding agent, or a high temperature fluxless solder, such as gold/tin eutectic alloy solder, bonds optical fiber 12 to substrate 14. As known to those skilled in the art, optical fiber 12 is preferably metallized with titanium, platinum or gold, for example, which improves the bond within groove 20. As such, substrate 14 constitutes a carrier for holding optical fiber 12 in a fixed relation thereto.

According to the invention, microactuator 10 does not employ an external reference, such as an alignment support structure or well and springs external to substrate 14. Commonly assigned U.S. Pat. Nos. 5,602,955 and 5,606,635, the entire disclosures of which are incorporated herein by reference, disclose an external alignment support structure fabricated by, for example, a LIGA electroforming process. The alignment support structure has relatively tall sidewalls and defines a well in which a carrier for holding the optical fiber is positioned. As known to those skilled in the art, LIGA processes are based on a combination of lithography, electroforming and molding. In fact, the acronym LIGA is derived from the German translation of lithography, electroforming and molding, namely, Lithography, Galvanoformung and Abformung. Advantageously, LIGA processes may be used to obtain relatively large height-to-width ratios which permit fabrication with precise tolerances. In contrast, microactuator 10 is an internally referenced structure and does not employ an external alignment support structure. As illustrated in FIG. 1, microactuator 10 includes an alignment frame 22 positioned, or located, on the top surface of substrate 14 which provides the internal reference for microactuator 10. In one exemplary embodiment, the alignment frame 22 is a metallic material such as copper or nickel.

Figure 4:
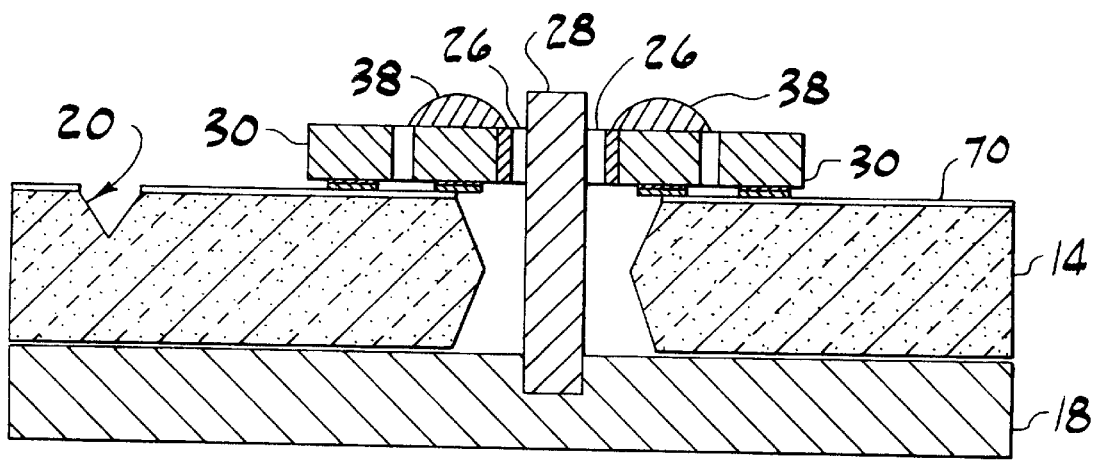
FIG. 4 is a partial cross section of the microactuator of FIG. 1 taken along the line 4—4 of FIG. 1.

As illustrated in FIG. 1, alignment frame 22 preferably includes two sets of spaced apart fingers 26, each set adapted to receive an alignment post 28 extending from base 18 through a corresponding hole etched in substrate 14 (see FIG. 4). The fingers 26 receive the alignment posts 28 so that alignment frame 22 is retained in a stationary position relative to base 18. On the other hand, this arrangement permits substrate 14 to move relative to base 18 and, thus, relative to alignment frame 22. In other words, fingers 26 substantially prevent alignment frame 22 from moving transversely to alignment post 28 relative to base 18.

Referring further to FIG. 1, microactuator 10 also includes a retaining block 30 connected to substrate 14 at each corner of the alignment frame 22. The retaining blocks 30 each have a recess 34 (see FIGS. 3 and 5) for receiving a respective foot 36 extending from alignment frame 22. According to the invention, the recesses 34 are larger than the feet 36 so that each foot 36 of alignment frame 22 fits loosely in its respective recess 34. This allows substrate 14 to move relative to alignment frame 22. In a preferred embodiment, microactuator 10 includes a hold-down structure 38 (see FIG. 5) which extends across each retaining block 30 to prevent feet 36 from coming out of the respective recesses 34. Advantageously, the hold-down structures 38 cooperate with the fingers 26 to essentially lock alignment frame 22 in place and retain it in a stationary position relative to base 18.

Figure 2:
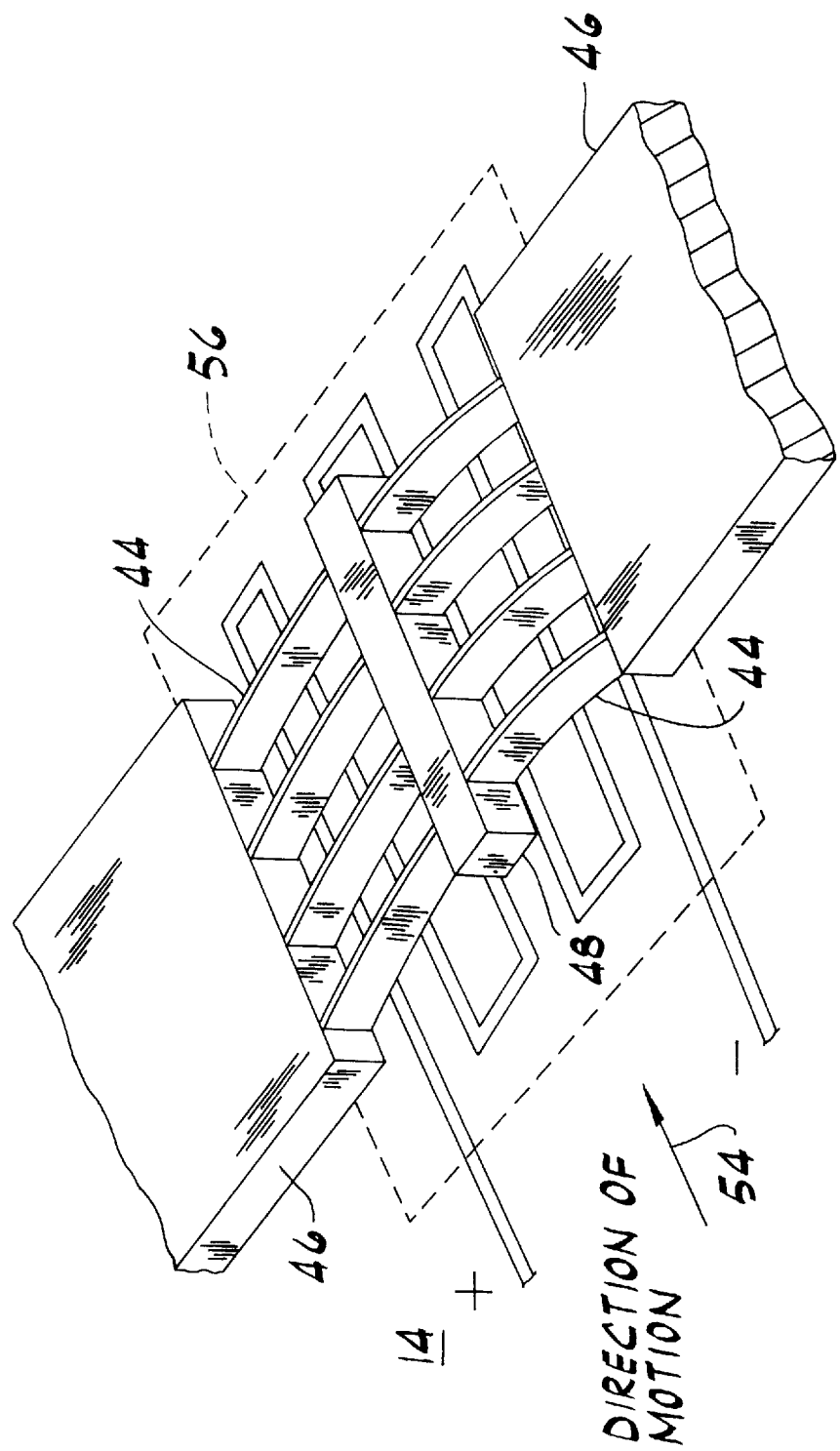
FIG. 2 is a perspective view of a thermal arch beam actuator of the microactuator of FIG. 1.

According to a preferred embodiment of the invention, microactuator 10 also includes two orthogonally positioned actuators, generally indicated at 42, which are adapted to move substrate 14 relative to base 18 in planar orthogonal directions, namely, the x and y directions in a plane defined by substrate 14. In turn, this permits optical fiber 12 to be precisely aligned with an associated optical device. As shown in FIG. 2, thermally actuated arch beam actuators preferably embody the actuators 42. Each arch beam actuator 42 generally includes a plurality of arches 44 supported between a pair of side support structures or pads 46. Advantageously, such actuators 42 are comprised of a single material so that they are less expensive and less complicated to fabricate than, for example, bimorphic actuators made from two materials. Although FIG. 2 illustrates actuator 42 as having four arches 44, the number of arches 44 may vary (e.g., 10 or 20). A preferred actuator 42 suitable for use in the present invention is disclosed in U.S. patent application Ser. No. 08/719,711, filed Sep. 27, 1996, the entire disclosure of which is incorporated herein by reference.

As shown in FIG. 2, a beam 48 extends across the arches 44. Preferably, each actuator 42 is positioned, or located, so that one end of beam 48 abuts alignment frame 22 (see FIGS. 1 and 3). When heated by a heater 52, thermal expansion causes the arches 44 to bend in a direction determined by their orientation, such as the direction indicated in FIG. 2 by arrow 54. As a result of the bending of arches 44, beam 48 moves against alignment frame 22 in a desired direction. In other words, deformable arches 44 engage alignment frame 22 via beam 48. Since alignment frame 22 is locked to alignment posts 28, the platform on which the respective actuator 42 is attached (i.e., substrate 14) moves in the opposite direction of beam 48.

In a preferred embodiment, a polysilicon resistive heater positioned, or located, in close proximity to each actuator 42 (i.e., directly below its arches 44) embodies the heater 52. Thus, heater 52 provides heat to arches 44 when electrically stimulated for urging beam 48 against alignment frame 22. Generally, this applies an oppositely directed force to substrate 14, sufficient to overcome any opposing forces, thereby moving substrate 14 relative to base 18 in the opposite direction in which beam 48 is moving (FIGS. 1 and 2). In other words, by electrically stimulating the respective heaters 52 independently, substrate 14 and, in turn, optical fiber 12 bonded thereto, can be controllably positioned in two orthogonal directions. For this reason, the top surface of base 18 and the bottom surface of substrate 14 are preferably polished which reduces friction between the two.

In general, the direction of arches 44 determines the direction in which actuator 42 bends, or deflects, and the amount of this movement is a function of the current supplied to polysilicon resistive heater 52. Thus, controlling the current supplied to heater 52 controls the deflection of actuator 42 and, consequently, controls the position of substrate 14 relative to alignment frame 22. Accordingly, microactuator 10 controllably positions substrate 14 relative to alignment frame 22 to precisely align the optical fiber 12 bonded to groove 20 with an associated optical device. In this embodiment, microactuator 10 is able to move optical fiber 12 approximately 20 to 30 $\mu$m or more in the x and/or y directions.

As will be described in detail below, a diaphragm 56 (see FIGS. 6 and 7) provided by etching the underside of substrate 14 below a portion of each actuator 42 thermally isolates heaters 52 from the rest of microactuator 10.

A variety of processes known to those skilled in the art are available for fabricating the side support structures 46 of actuators 42. For example, an electroforming process, such as a LIGA process, may be used to construct these and other structures (e.g., side support structures 46, retaining blocks 30, posts 28) of microactuator 10.

In the illustrated embodiment, microactuator 10 also provides connections or leads 58 to a current supply (not shown) which supplies current to the polysilicon heaters 52 to resistively heat the respective arch beam actuators 42. In order to facilitate this electrical stimulation of heaters 52, bonding pads 60, preferably thin films of a conductive material (e.g., gold), are formed on opposite end portions of the resistive element of each heater 52 for connection to the leads 58 from the current supply.

Figure 3:
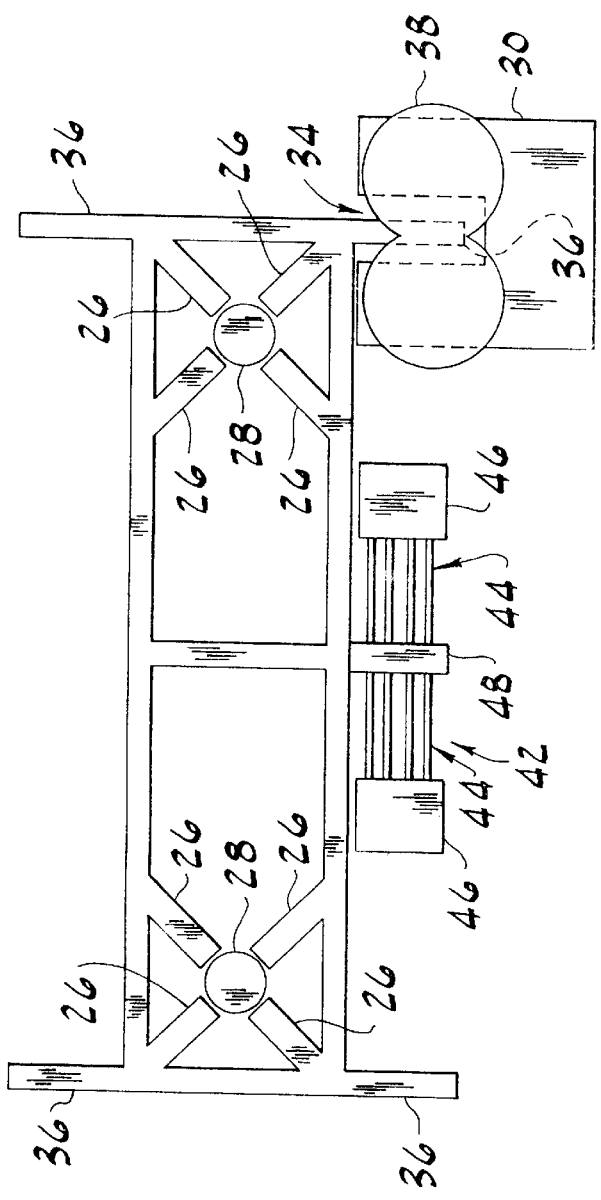
FIG. 3 is a top view of an alignment frame of the microactuator of FIG. 1.

FIG. 3 provides a partial top view of microactuator 10 to illustrate alignment frame 22 in greater detail. As shown, fingers 26 define apertures for receiving alignment posts 28. Preferably, the gap between posts 28 and the fingers 26 of alignment frame 22 is very small or zero to substantially prevent the translational movement of alignment frame 22. FIG. 3 also illustrates the relationship between one of the feet 36 and its corresponding retaining block 30. As shown, the recess 34 of retaining block 30 receives foot 36, allowing room for relative movement between block 30 and foot 36. The hold-down structure 38 closes the top of recess 34 to prevent foot 36 from coming out. FIG. 3 also shows one of the arch beam actuators 42.

Referring again to FIG. 1, microactuator 10 includes first and second counteract springs 62, 64 anchored to substrate 14 by a support structure or pad 66 and biased against alignment frame 22 for providing a reference or equilibrium position relative to base 18. In this embodiment, the springs 62, 64 apply a bias force to substrate 14 counter to the force applied by actuators 42 upon deflection. This bias force is preferably less than the force applied by arch beam actuators 42 for causing substrate 14 to move. When actuated, arch beam actuators 42 overcome the bias force provided by springs 62, 64, as well as the frictional forces between substrate 14 and base 18, the bending moment of fiber 12 and the bending moments of the leads 58 connected to pads 60, to move substrate 14 in the desired direction.

Again, a LIGA process, for example, may be used to form springs 62, 64. It is to be understood that several spring configurations are contemplated for initially positioning substrate 14 without deviating from the scope of the invention. It is also to be understood that springs may be used to retain alignment frame 22 relative to substrate 14 instead of retaining blocks 30 and hold-down structures 38. Advantageously, springs 62, 64 are located on substrate 14 rather than being external to microactuator 10.

As described above, alignment frame 22 and counteract springs 62, 64 define the internal reference which provides an initial position for optical fiber 12 relative to base 18. Thereafter, microactuator 10 adjusts the position of substrate 14 relative to base 18 to precisely align optical fiber 12 with an associated optical device. In one embodiment, the initial position of substrate 14 permits optical fiber 12 to be slightly misaligned (e.g., by 5 to 10 $\mu$m) relative to the optical device in a predetermined direction. The predetermined direction is preferably selected based on the relative movement provided by actuators 42 so that they can more easily compensate for the slight misalignment and align optical fiber 12 with the optical device.

In general, microelectromechanical systems (MEMS), such as microactuator 10, are integrated systems which combine electrical and mechanical components in a micro device. Typically, integrated circuit (IC) batch processing techniques are used to fabricate MEMS, which range in size from micrometers to millimeters. These IC processes, sometimes referred to as microfabrication, produce three-dimensional microstructures using sequential photolithographic pattern transfer and etching or deposition in a batch processing method. In batch processing generally, patterns which define the components of a microstructure are photolithographically transferred from a template to a semiconducting substrate using a photosensitive organic coating. An etching or deposition process then transfers the coating pattern into the substrate or into a solid-state thin film coating. Each template, called a mask, often contains numerous identical sets of patterns, with each set representing a separate microstructure. Here, the third dimension is the height above the substrate of the deposited layer or the depth into the substrate of an etched structure. Microfabrication typically produces microstructures from approximately 1 to 500 µm tall.

FIGS. 4–7 illustrate exemplary components of microactuator 10 manufactured according to known MEMS microfabrication processes.

In one preferred embodiment, base 18 comprises a layer of polished silicon or other polished material. As described above, a LIGA process may be used to form the posts 28 to a height of approximately 400 µm, for example. When substrate 14 is positioned on base 18, each post 28 extends through a respective aperture 68 in substrate 14. For example, the apertures 68 are formed in substrate 14 by anisotropically wet-etching, laser cutting or reactive ion, or plasma, etching. In addition, FIG. 4 illustrates a layer of nitride 70 on the top surface of substrate 14. As is known in the art, the nitride layer 70 forms a base layer which adds strength to the structure as well as a chemical barrier or etchstop layer. Typically, nitride layers such as layer 70 are thermally grown on silicon wafers.

According to the invention, alignment frame 22, fabricated from nickel, for example, is released from the top surface of substrate 14 to permit the relative movement between alignment frame 22 and substrate 14. One process known in the art for releasing structures from a substrate is a timed etching process. In such a process, a release layer covers the substrate's top surface. A LIGA process, for example, is used to electroplate the various structures on the substrate. After forming the structures, a chemical etch undercuts the release layer. By properly timing the etch, some structures are completely undercut and, thus, released, while other remain attached to the substrate. In a preferred embodiment of the present invention, retaining blocks 30, side support structures 46 and spring support structure 66 remain attached to substrate 14 while the other structures of microactuator 10 (i.e., alignment frame 22, arches 44, beam 48 and springs 62, 64) are released. Thus, in this sense, alignment frame 22, actuators 42 and springs 62, 64 are processed so that they have a particular position on substrate 14 relative to optical fiber 12 and posts 28.

As shown in FIG. 4, groove 20 and aperture 68 are preferably anisotropically etched in substrate 14 in two different directions or orientations (e.g., <110> and <100>). In order to provide these different types of etching, substrate 14 may be comprised of at least two different wafers, such as silicon wafers, having different orientations (e.g., <110> and <100>). In addition, a material having a relatively low coefficient of friction, such as a TEFLON® coating, may be used to coat substrate 14 to reduce the frictional forces between it and base 18.

Figure 5:
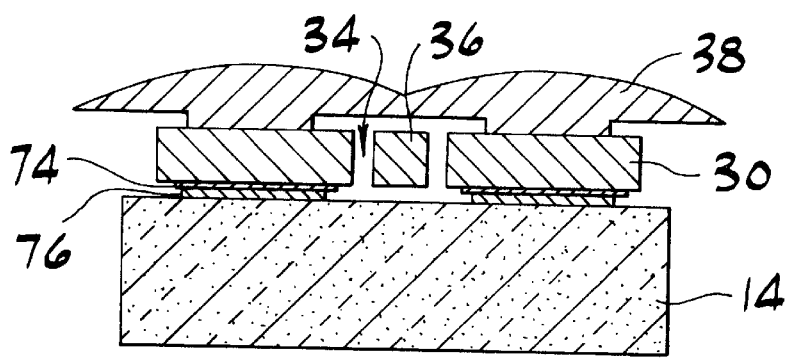
FIG. 5 is a partial cross section of the microactuator of FIG. 1 taken along the line 5—5 of FIG. 1.

FIG. 5 illustrates one hold-down structure 38 in greater detail. As illustrated, hold-down structure 38 is preferably embodied by an overplating of nickel, for example. In this instance, a first nickel plating forms retaining block 30, which remains connected to substrate 14 by an oxide layer 74 and a plating base 76 (e.g., copper). A second nickel plating is then built up on top of retaining block 30 to retain the respective foot 36 in recess 34. In this instance, a photoresist (e.g., PMMA) prevents the electroplating of nickel from connecting feet 36 to the respective retaining blocks 30.

Figure 6:
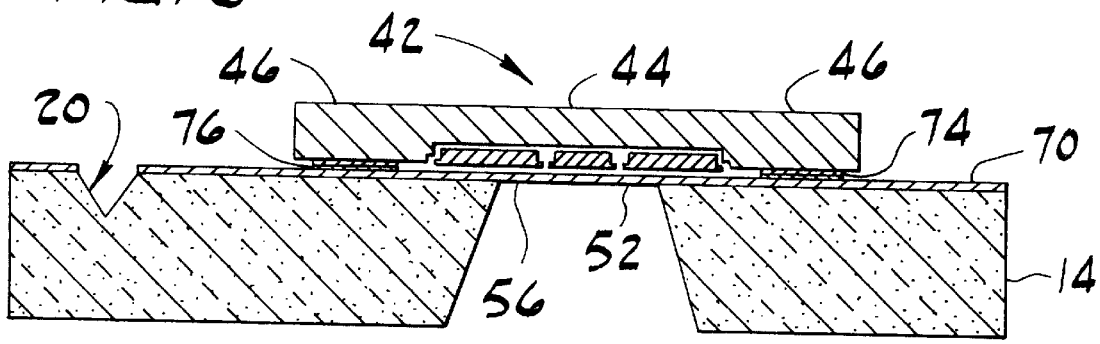
FIG. 6 is a partial cross section of the microactuator of FIG. 1 taken along the line 6—6 of FIG. 1.

Referring now to FIG. 6, one of actuators 42 relative to polysilicon heater 52 is shown in greater detail. As shown in FIG. 6, fabrication of microactuator 10 preferably releases polysilicon heater 52 from substrate 14. In this instance, actuator 42, also formed from nickel, for example, is connected to substrate 14 by the oxide layer 74 and the plating base 76. FIG. 6 also illustrates the etching on the underside of substrate 14 for diaphragm 56 (see FIG. 7).

Figure 7:
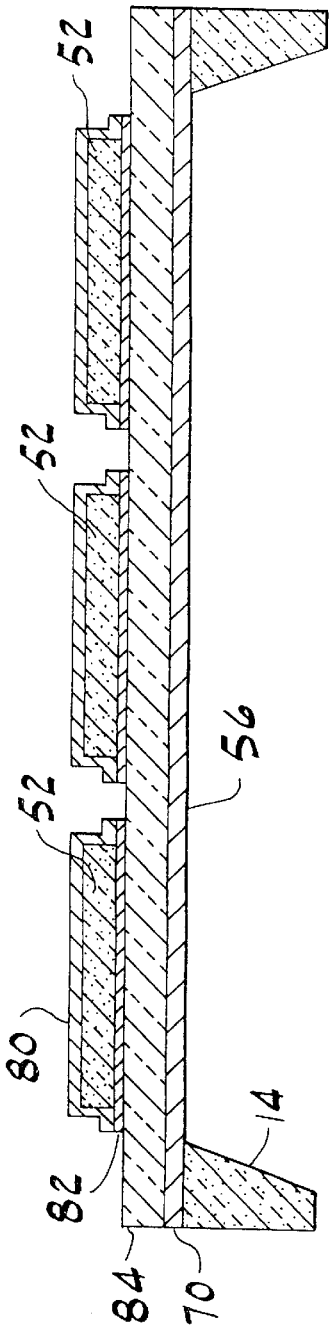
FIG. 7 is a cross section of a polysilicon heater of the microactuator of FIG. 1.

FIG. 7 illustrates one preferred embodiment of polysilicon heater 52 for causing thermal expansion in actuators 42. Preferably, heater 52 comprises a serpentine resistive element (see FIG. 2) which heats when energized with current. According to the invention, the etching on the bottom side of substrate 14 stops at nitride layer 70 which forms a diaphragm 56 on the top surface of substrate 14. Advantageously, this arrangement thermally isolates heater 52 from the other components of microactuator 10. For example, by thermally isolating optical fiber 12 from heater 52, optical fiber 12 may be maintained at a desired temperature to prevent temperature fluctuation from altering or otherwise affecting its alignment. In addition to providing thermal isolation, the etching causes a greater percentage of the heat provided by heater 52 to be transferred to actuator 42. As a result, actuator 42 has an improved deflection response and efficiency.

In addition to the resistive element of polysilicon heater 52, FIG. 7 shows a nitride layer 80 on top of polysilicon heater 52 which isolates it from actuator 42 and another nitride layer 82 beneath heater 52 which isolates it from substrate 14. In one embodiment, microactuator 10 also includes a layer 84 of phospho silicate glass (PSG) between nitride layer 70 and nitride layer 82. It is to be understood that the various layers are merely exemplary and heater 52 may be embodied without them. For example, nitride layer 82 and/or PSG layer 84 may be omitted from microactuator 10.

In an alternative embodiment of the invention as shown in FIG. 8, microactuator 10' includes a bimorphic actuator 88 intermediate to base 18 and substrate 14. Advantageously, the bimorphic actuator 88 is adapted to controllably position substrate 14 in the z direction relative to x and y direction actuators 42. In general, layers of two materials which respond differently to electrical stimulation embody bimorphic actuator 88. For example, bimorphic actuator 88 is a bimorph having a first layer of silicon (i.e., base 18) and a second layer of piezoelectric material, such as PZT. Thus, a voltage applied across the piezoelectric material causes bimorphic actuator 88 to deflect in a predetermined direction by a controllable amount to move substrate 14. The piezoelectric material of bimorphic actuator 88 deflects downwardly, for example, against base 18 upon electrical stimulation which causes substrate 14 to move up in the z direction. In this embodiment, the amount of the deflection of bimorphic actuator 88 is proportional to the magnitude of the electrical stimulation. As before, bonding pads (not shown) are preferably disposed on bimorphic actuator 88 to facilitate, for example, application of a predetermined voltage thereacross. In this instance, "sandwich" electrodes comprising a conductive layer above the layer of piezoelectric material and another conductive layer below the layer of piezoelectric material are used for applying a voltage to bimorphic actuator 88.

In another embodiment, bimorphic actuator 88 includes two layers of materials which have different coefficients of thermal expansion, such as a first layer of silicon and a second layer of nickel or copper which has a larger coefficient of thermal expansion than silicon. As is known in the art, a metallic layer can be deposited on a silicon layer by a variety of methods, including preferential sputtering, directed evaporation and electroplating, without deviating from the scope of the invention.

Preferably, the V-shaped groove 20 is deep enough so that optical fiber 12 is initially slightly below (e.g., approximately 5 μm below) its final aligned position. As such, microactuator 10' controllably adjusts the position of optical fiber 12 upwardly and into alignment with the optical device as described above. It is to be understood, however, that groove 20 may be formed so that it initially holds optical fiber 12 in other relationships with respect to the final aligned position without deviating from the scope of the invention.

As described herein, microactuator 10 of the present invention precisely aligns optical fiber 12 with an associated optical device by controllably varying the deflection of one or both of the arch beam actuators 42 and/or bimorphic actuator 88. The maximum output power indicates the efficiency with which the optical signals produced by the optical device are coupled to and transmitted via optical fiber 12 and, thus, indicates the alignment's accuracy. In one preferred embodiment, the relative positions of substrate 14 and base 18 are fixed when optical fiber 12 is in its aligned position. For example, an adhesive, bonding agent or solder which fills apertures 68 may be used to secure substrate 14 to posts 28 once microactuator 10 precisely aligns optical fiber 12 with the optical device. During this process of aligning and bonding an optical fiber, microactuator 10 does not heat or otherwise perturb adjacent microactuators or optical fibers maintained which enables the precise alignment of a plurality of adjacent optical fibers. Also, since microactuator 10 need not be positioned in an external alignment support structure or well, a greater packing density may be achieved. For example, one preferred embodiment of microactuator 10 is about 5 mm×5 mm in size.

Further, microactuator 10 of the present invention is particularly well suited for use in controllably aligning optical fiber 12 with an optical device, such as a laser diode, within a hermetically sealed package. U.S. Pat. No. 5,602,955 discloses hermetically sealing a microactuator as contemplated by the present invention. Once optical fiber 12 is precisely aligned, the respective positions of optical fiber 12 and its associated optical device are fixed to maintain the precise alignment. Thereafter, microactuator 10 remains within the hermetically sealed package which further ensures that optical fiber 12 maintains alignment with the optical device. In the alternative, microactuator 10 subsequently re-positions or realigns optical fiber 12 as needed to compensate for variations in the optical alignment which occur during use if substrate 14 is not bonded in position to base 18 following the initial alignment of optical fiber 12 with the optical device.

In addition to a hermetically sealed package, one or more microactuators 10 can be disposed within a fiber optic connector as described in commonly assigned U.S. Pat. No. 5,606,635. In this embodiment, microactuators 10 can precisely align optical fibers with respective lens elements of the fiber optic connector in order to collimate the optical signals transmitted therethrough.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A microactuator for precisely aligning an optical fiber with an optical device, said optical device having a fixed relation to a base, said microactuator comprising:
   a carrier positioned on the base for holding the optical fiber in a fixed relation to the carrier;
   an alignment frame positioned on the carrier remotely from the optical fiber, said alignment frame being adapted to engage the base and the carrier, said carrier being movable relative to the alignment frame and the base; and
   a first actuator having a beam for engaging a portion of the alignment frame and a pad affixed to the carrier, said beam and said pad moving relative to each other when the first actuator is actuated, said first actuator being positioned on the carrier so that the beam engages and applies a force to the alignment frame in a first direction when the first actuator is actuated whereby the pad applies an opposite force to the carrier causing the carrier to move in a direction opposite the first direction for controllably positioning the carrier relative to the base and precisely aligning the optical fiber with the optical device.

2. The microactuator of claim 1 wherein the base has a post extending therefrom, and wherein the carrier has a carrier body defining an aperture therethrough for receiving the post when the carrier is positioned on the base.

3. The microactuator of claim 2 wherein the alignment frame includes a plurality of spaced apart fingers located above the aperture in the carrier for receiving the post extending from the base through the carrier, each of said fingers having an end portion adjacent a portion of the post thereby substantially preventing translational movement of the alignment frame relative to the post.

4. The microactuator of claim 1 wherein the alignment frame includes a plurality of feet extending from the alignment frame and further comprising a retaining block corresponding to each of the feet, each retaining block being positioned on and connected to the carrier and having a recess therein for receiving the corresponding foot, said recess providing room for relative movement between the retaining block and the corresponding foot when the carrier is moved relative to the alignment frame and the base.

5. The microactuator of claim 4 further comprising a hold-down structure corresponding to each of the retaining blocks, each hold-down structure extending across the recess in the corresponding retaining block to retain the corresponding foot in the recess.

6. The microactuator of claim 5 wherein the hold-down structure comprises an overplating of metal.

7. The microactuator of claim 1 further comprising at least one spring affixed to the carrier and biased against a portion of the alignment frame, said spring applying a force to the carrier to bias the carrier toward an equilibrium reference location.

8. The microactuator of claim 1 wherein the beam deflects in the first direction in response to thermal changes and further comprising a heater positioned proximate the first actuator for selectively heating the first actuator to cause the beam to deflect in the first direction.

9. The microactuator of claim 8 wherein the heater is a polysilicon resistive heater formed on the carrier below the first actuator and responsive to electrical stimuli for heating.

10. The microactuator of claim 8 wherein the heater has electrical leads for connecting the heater to a current supply to provide current to the heater thereby causing the heater to heat and the first actuator to deflect.

11. The microactuator of claim 8 wherein the carrier is etched from beneath the heater to form a diaphragm for thermally isolating the heater.

12. The microactuator of claim 1 wherein the first actuator is a thermally actuated arch beam actuator having at least one arch connecting the pad and the beam, said arch deforming in response to thermal changes to deflect the beam relative to the pad.

13. The microactuator of claim 1 further comprising a second actuator having a beam for engaging another portion of the alignment frame and a pad affixed to the carrier, said beam and said pad of the second actuator moving relative to each other when the second actuator is actuated, said second actuator being positioned on the carrier so that its beam engages and applies a force to the alignment frame in a second direction generally orthogonal to the first direction when the second actuator is actuated whereby the pad of the second actuator applies an opposite force to the carrier causing the carrier to move in a direction opposite the second direction for controllably positioning the carrier relative to the base and precisely aligning the optical fiber with the optical device.

14. The microactuator of claim 13 wherein the second actuator is a thermally actuated arch beam actuator having at least one arch connecting the pad and the beam of the second actuator, said arch of the second actuator deforming in response to thermal changes to deflect the beam relative to the pad.

15. The microactuator of claim 13 further comprising a third actuator for moving the carrier in a third direction generally orthogonal to both the first and second directions.

16. The microactuator of claim 15 wherein the third actuator comprises a bimorphic actuator having a first layer of one material and a second layer of another material, said materials of the first and second layers responding differently to electrical stimuli so that the bimorphic actuator is deflected in the third direction by the electrical stimuli and operably urged against a portion of the carrier thereby moving the carrier in the third direction.

17. The microactuator of claim 16 wherein the material of the second layer of said bimorphic actuator is a piezoelectric material, and wherein the bimorphic actuator has electrical leads for connecting the bimorphic actuator to a voltage supply to provide a voltage to the piezoelectric material thereby causing the bimorphic actuator to deflect.

18. The microactuator of claim 1 wherein the carrier includes a carrier body defining a groove therein for receiving the optical fiber and for maintaining the optical fiber in a fixed relation to the carrier body, said groove being remotely located relative to the first actuator and the alignment frame.

19. A method of precisely aligning an optical fiber with an optical device, said optical device having a fixed relation to a base, said method comprising the steps of:

holding the optical fiber in a fixed relation to a carrier;

positioning an alignment frame on the carrier remotely from the optical fiber, said alignment frame being adapted to engage the base and the carrier, said carrier being movable relative to the alignment frame and the base;

positioning an actuator on the carrier and connecting the actuator thereto, said actuator having a beam for engaging the alignment frame and a pad affixed to the carrier, and wherein the step of positioning the actuator includes disposing the actuator so that the beam engages and applies a force to the alignment frame in a predetermined direction when the actuator is actuated; and actuating the actuator whereby the pad applies an opposite force to the carrier causing the carrier to move in a direction opposite the predetermined direction for controllably positioning the carrier relative to the base and precisely aligning the optical fiber with the optical device.

20. A method of fabricating a microactuator for precisely aligning an optical fiber with an optical device, said optical device having a fixed relation to a base, said method comprising the steps of:

forming a carrier;

etching a groove in the carrier for receiving the optical fiber and for maintaining the optical fiber in a fixed relation to the carrier;

forming an alignment frame on the carrier remotely from the groove, said alignment frame being adapted to engage the base and the carrier, said carrier being movable relative to the alignment frame and the base;

forming a first actuator on the carrier, said first actuator having a beam for engaging a portion of the alignment frame and a pad affixed to the carrier, said beam and said pad moving relative to each other when the first actuator is actuated; and positioning the carrier on the base; and wherein the step of forming the first actuator includes disposing the first actuator so that the beam engages and applies a force to the alignment frame in a first direction when the first actuator is actuated whereby the pad applies an opposite force to the carrier causing the carrier to move in a direction opposite the first direction for controllably positioning the carrier relative to the base and precisely aligning the optical fiber with the optical device.

21. The method of claim 20 further comprising the step of forming a post extending from the base, and wherein the step of forming the carrier includes etching an aperture through the carrier for receiving the post when the carrier is positioned on the base.

22. The method of claim 21 wherein the step of forming the alignment frame includes forming a plurality of spaced apart fingers integrally with the alignment frame and positioned above the aperture in the carrier and further comprising the step of receiving the post with the fingers, each of said fingers having an end portion adjacent a portion of the received post thereby substantially preventing translational movement of the alignment frame relative to the post.

23. The method of claim 20 wherein the step of forming the alignment frame includes forming a plurality of feet extending from the alignment frame and further comprising the step of forming a retaining block on the carrier corresponding to each of the feet, each retaining block having a recess therein for receiving the corresponding foot and being connected to the carrier, said recess providing room for relative movement between the retaining block and the corresponding foot when the carrier is moved relative to the alignment frame and the base.

24. The method of claim 23 further comprising the step of forming a hold-down structure corresponding to each of the retaining blocks, each hold-down structure extending across the recess in the corresponding retaining block to retain the corresponding foot in the recess.

25. The method of claim 24 wherein the step of forming the retaining block comprises electroplating a first layer of metal and the step of forming the hold-down structure comprises electroplating a second layer of metal.

26. The method of claim 20 further comprising the steps of forming at least one spring on the carrier and affixing the spring thereto, said spring being biased against a portion of the alignment frame, said spring applying a force to the carrier to bias the carrier toward an equilibrium reference location.

27. The method of claim 20 wherein the beam deflects in the first direction in response to thermal changes and further comprising the step of selectively heating the first actuator to cause the beam to deflect in the first direction.

28. The method of claim 27 wherein the step of heating the first actuator includes forming a polysilicon resistive heater on the carrier below the first actuator, said polysilicon heater being responsive to electrical stimuli for generating heat.

29. The method of claim 28 wherein the step of forming the carrier includes etching the carrier from beneath the heater to form a diaphragm for thermally isolating the heater.

30. The method of claim 27 further comprising forming electrical leads on the carrier for connecting the heater to a current supply to provide current to the heater thereby causing the heater to generate heat and the first actuator to deflect.

31. The method of claim 20 further comprising the step of forming a second actuator on the carrier, said second actuator having a beam for engaging another portion of the alignment frame and a pad affixed to the carrier, said beam and said pad of the second actuator moving relative to each other when the second actuator is actuated, and wherein the step of forming the second actuator includes disposing the second actuator so that its beam engages and applies a force to the alignment frame in a second direction generally orthogonal to the first direction when the second actuator is actuated whereby the pad of the second actuator applies an opposite force to the carrier causing the carrier to move in a direction opposite the second direction for controllably positioning the carrier relative to the base and precisely aligning the optical fiber with the optical device.

32. The method of claim 31 further comprising the step forming a third actuator for moving the carrier in a third direction generally orthogonal to both the first and second directions.

33. The method of claim 32 wherein the step of forming the third actuator includes depositing a first layer of one material and a second layer of another material, said materials of the first and second layers responding differently to electrical stimuli so that the third actuator is deflected in the third direction by the electrical stimuli and operably urged against a portion of the carrier thereby moving the carrier in the third direction.

34. The method of claim 33 wherein the material of the second layer of said third actuator is a piezoelectric material, and further comprising the step of forming electrical leads on the piezoelectric material for connecting the third actuator to a voltage supply to provide a voltage to the piezoelectric material thereby causing the third actuator to deflect.

35. The method of claim 20 further comprising the step of securing the carrier to the base once the optical fiber is aligned with the optical device.

* * * * *